(12) United States Patent
Alger et al.

(10) Patent No.: US 6,839,555 B2
(45) Date of Patent: Jan. 4, 2005

(54) METHOD AND APPARATUS FOR SUPPORTING VOICE MESSAGE SERVICES WITH AUTOMATIC REBOUND IN A WIRELESS INTELLIGENT NETWORK

(75) Inventors: Langdon Edward Alger, Lake Forest, IL (US); Robert Thomas Calabrese, Naperville, IL (US); Tracy Edwin III East, Oswego, IL (US); John Mitchell Rendak, Naperville, IL (US); Robert John Zurawski, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 554 days.

(21) Appl. No.: 09/846,972

(22) Filed: Apr. 30, 2001

(65) Prior Publication Data

US 2002/0160755 A1 Oct. 31, 2002

(51) Int. Cl.[7] .......................... H04M 11/10; H04M 3/42
(52) U.S. Cl. ...................... 455/413; 455/412; 455/414; 455/417; 455/422
(58) Field of Search ................................ 455/412, 413, 455/414, 415, 417, 422, 445, 458; 379/550, 67.1, 88.22, 88.25

(56) References Cited

U.S. PATENT DOCUMENTS

| | | | |
|---|---|---|---|
| 5,857,013 A | 1/1999 | Yue et al. ..................... | 379/67 |
| 6,324,396 B1 * | 11/2001 | Vasa et al. ................... | 455/415 |
| 6,389,279 B1 * | 5/2002 | Calabrese et al. .......... | 455/417 |
| 6,418,306 B1 * | 7/2002 | McConnell ................. | 455/413 |

FOREIGN PATENT DOCUMENTS

WO    WO 00/51327    * 8/2000 .......... H04M/3/533

OTHER PUBLICATIONS

U.S. patent Publication (US 2002/0101964 A1), Contractor, "Systems and Methods for peruse No–Answer Message", Aug. 1, 2002.*

* cited by examiner

Primary Examiner—Allan Hoosain
(74) Attorney, Agent, or Firm—John B. MacIntyre; Steven R. Santema

(57) ABSTRACT

The present invention supports a voice messaging service in a wireless communications system. A subscriber accesses a voice messaging system (VMS) through a wireless device in order to retrieve voice messages that are deposited into the subscriber's voice mailbox. The subscriber may wish to return a call to a call sender. The call is established to the call sender's directory number through a serving mobile switching center (MSC) in concert with a service control point (SCP) and an intelligent peripheral (IP). The subscriber may return to the VMS so that the subscriber can resume the voice mail session. The subscriber ends the call or optionally enters a feature rebound code. The IP detects an associated call event and initiates a connection between the subscriber and the VMS. The IP notifies the SCP, causing the SCP to instruct the serving MSC to re-establish the connection between the subscriber and the VMS.

4 Claims, 6 Drawing Sheets

300

METHOD AND APPARATUS FOR SUPPORTING VOICE MESSAGE SERVICES WITH AUTOMATIC REBOUND IN A WIRELESS INTELLIGENT NETWORK

FIELD OF THE INVENTION

The present invention relates to a method and apparatus for supporting voice messaging service in a wireless communications system.

BACKGROUND OF THE INVENTION

Wireless communications systems allow a subscriber telephone communications even though the subscriber may be traversing the wireless communications system of the subscriber's service provider or roaming outside the service provider's wireless communication system. However, communications to the subscriber may not be possible if radio frequency (RF) coverage is not ubiquitous or if a service agreement between the subscriber's service provider and the operator of another wireless communications system is not established. Moreover, there are situations, such as when in a court of law, when the subscriber does not wish to be disturbed. In such cases, the subscriber may wish to have the call sender deposit a voice message so that the subscriber can retrieve the voice message at a later time.

With the prior art, the subscriber may write the call sender's directory number (DN), disconnect from the voice messaging system, and dial the call sender's DN. Once the subscriber has completed the call with the call sender, the subscriber may wish to return to the voice messaging system. In such a case, the subscriber reconnects with the voice messaging system and navigates to the next voice message. This process is very cumbersome and user-unfriendly.

As an alternative to the manual process described heretofore, a voice messaging system (VMS) may use a front-end switch and a telephone facility configuration that enables the subscriber to navigate between the voice messaging system and the call sender. FIG. 1 illustrates an architecture of wireless communications system 100 that provides voice messaging service according to the prior art. The subscriber, through wireless device 101, accesses the subscriber's voice mailbox located on voice messaging system (VMS) 104 through radio link 110, serving mobile switching center (MSC) 102, interface 111, home MSC 103, and interface 112. With the architecture shown in FIG. 1, the subscriber may be listening to a voice message that has been deposited by a call sender 106. VMS 104 has previously collected the directory number (DN) of call sender 106 when call sender 106 deposited the voice message. The collection of the call sender's DN can be obtained through means such as collecting the corresponding digits through a corresponding signaling system 7 (SS7) message that contains the call sender's DN. Alternately, the digits can be collected by prompting call sender 106 in conjunction with a touchtone keypad or through automatic speech recognition. In order for the subscriber to reply to call sender 106 in response to the voice message, the subscriber can enter a feature code (e.g. *88). VMS 104 recognizes the subscriber's request and establishes a call to call sender 106 through facility 113, facility 114, network 105, and facility 115 to call sender 106.

In the architecture shown in FIG. 1, VMS 104 configures the call through an additional facility 113 in order to complete the call. The architecture in FIG. 1 utilizes a front-end switch that is integrated with VMS 104, although an alternate architecture can utilize a separate front-end switch according to the prior art. Because facilities 111, 112, and 113 use resources on serving MSC 102 and home MSC 103, and interface ports on VMS 104 are utilized during the entire time duration of the call, the cost for the service provider to offer the voice messaging service can be substantially increased. The facility configuration associated with the call enables VMS 104 to monitor the call throughout the time duration of the call. Because VMS 104 (in conjunction with facility 113) "camps-on" the call, the subscriber may request to return to the voice mailbox after completing the call to the call sender.

These examples underscore the need for providing a solution that enables the subscriber to navigate between the subscriber's voice mailbox and a call to a call sender and that obviates the need for additional facilities that must be configured during the time duration of a call. Such a solution will provide the customer with an efficient means for returning calls to voice messages while reducing the associated costs to the wireless service provider.

BRIEF SUMMARY OF THE INVENTION

The present invention provides an improved voice messaging service in a wireless communications system. The wireless communications system comprises a serving mobile switching center (MSC), a service control point (SCP), a voice messaging system (VMS), and an intelligent peripheral (IP). A subscriber preferably accesses the VMS through a wireless device in order to retrieve voice messages that are deposited into the subscriber's voice mailbox. The serving MSC provides radio coverage for the wireless device. When listening to a voice message that is deposited by a call sender, the subscriber may wish to return a call to the call sender. In such a case, the subscriber initiates the call by invoking a call sender option (such as by entering a feature code). The call is established to the call sender's directory number (DN) through the serving MSC in concert with the SCP and the IP.

After completing the call to the call sender, the subscriber may return to the VMS so that the subscriber can resume the voice mail session at a desired location corresponding with the subscriber's previous interactions with the VMS. In such a case, the subscriber ends the call or optionally enters a feature rebound code through the wireless device. The IP detects the occurrence of the call event and initiates a connection between the subscriber and the VMS so that the subscriber can resume the voice mail session. Consequently, the IP notifies the SCP about the call event, causing the SCP to instruct the serving MSC to re-establish the connection between the subscriber and the VMS. The VMS utilizes a stored history of the subscriber's voice mail session in accordance with a routing number, and consequently the subscriber resumes the voice mail session.

The present invention automates the capability of the subscriber rebounding to the VMS in order to resume the voice mail session after returning a call to call sender. The present invention utilizes the IP to monitor the call between the subscriber and the call sender while reducing costs by configuring facilities that are proximate to the serving MSC. Moreover, the facilities are utilized only during the time that the subscriber is returning a call to the call sender and not during the entirety of the voice mail session as required with some embodiments according to prior art. Thus, the present invention reduces the cost of providing voice messaging services with capabilities that the subscriber desires.

The disclosure presents a preferred embodiment in which a wireless communications system utilizes messages in accordance with TIA/EIA-41-D (Cellular Radiotelecommunications Intersystem Operations).

DETAILED DESCRIPTION OF THE INVENTION

Figure 1:
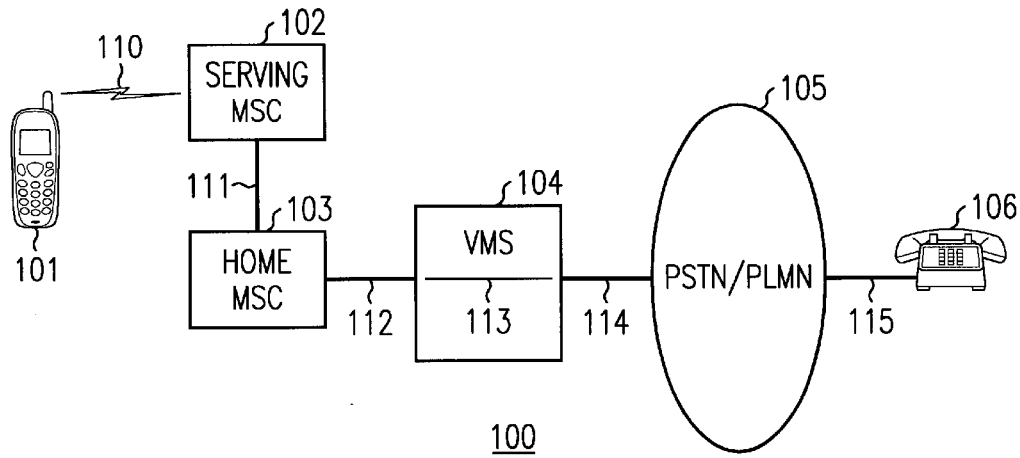
FIG. 1 illustrates an architecture of a wireless communications system providing voice messaging service in accordance with the prior art.
Figure 2:
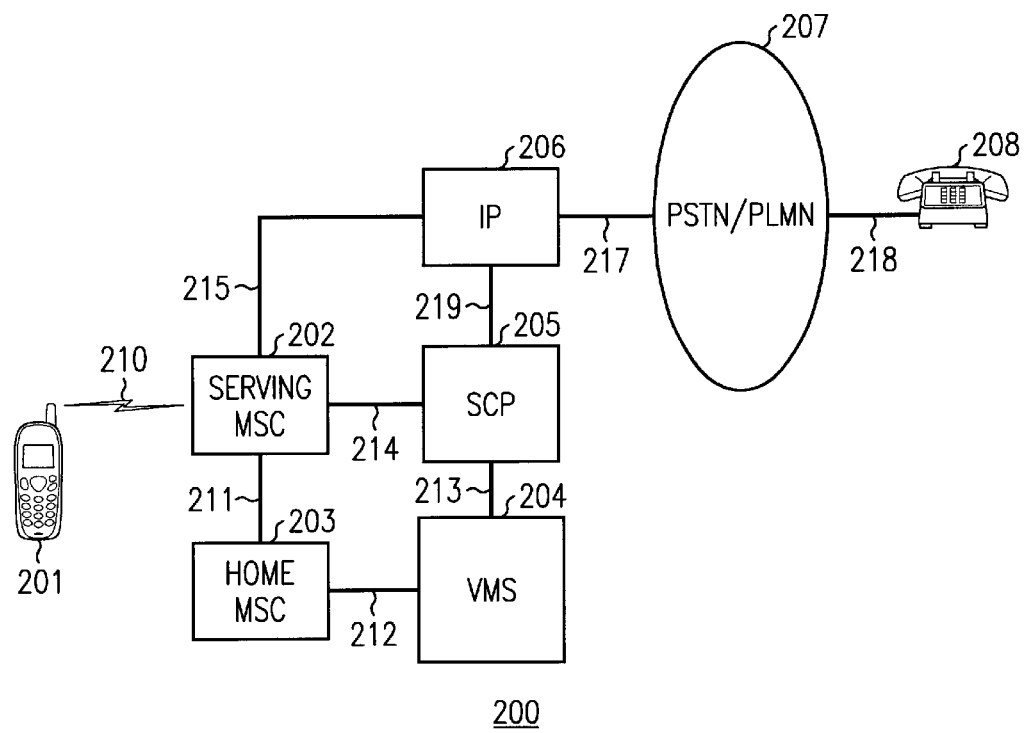
FIG. 2 illustrates an architecture of a wireless communications system providing voice messaging service in accordance with the present invention.

FIG. 2 illustrates an architecture of wireless communications system 200 providing voice messaging services in accordance with the present invention. A subscriber utilizes wireless device 201 to retrieve the subscriber's voice mail by accessing voice messaging system (VMS) 204. In order to do so, the subscriber initiates a call request from wireless device 201 to serving MSC 202 over radio link 210 by dialing a voice mail access code (e.g. "*86"). The discussion that is associated with FIG. 3 further describes the subscriber's interactions.

Serving MSC 202 queries service control point (SCP) 205 over interface 214 with the identification of wireless device 201 and dialed digits as entered by the subscriber into wireless device 201. (The discussion regarding FIG. 5 further describes the corresponding message scenario.) SCP 205 returns a first routing number, which is associated with VMS 204, to serving MSC 202. Serving MSC 202 directs the call connection from wireless device 201 to VMS 204 through facility 211, home MSC 203, and interface 212. In an exemplary embodiment, VMS 204 is associated with home MSC 203 at which the subscriber is provisioned. In a second embodiment, the association between home MSC 203 and VMS 204 is not utilized. A connection is established between wireless device 201 and VMS 204 in which wireless device 201 retrieves voice messages from the subscriber's voice mailbox.

While listening to a voice message deposited by a call sender, the subscriber may wish to respond to the call sender. The call sender's directory number (DN) is stored at VMS 204 in association with the voice message. In such a case, the subscriber enters a call sender feature invocation code (e.g. "*88") that is sent to VMS 204 with in-band signaling or out-of-band signaling. VMS 204 interprets the call sender feature invocation code and initiates the redirection of the connection in which a call is established between wireless device 201 and call sender 208's directory number (DN) through radio link 210, serving MSC 202, facility 215, public switching telephone network or public land mobile network (PSTN/PLMN) 207, intelligent peripheral (IP) 206, facility 217, and facility 218. IP 206 functions as an adjunct processor that monitors a call between the subscriber (wireless device 201) and call sender 208 in order to detect call events. VMS 204 initiates the redirection by sending the appropriate messaging to SCP 205 through interface 213 (as further described in the context of FIG. 3). VMS 204 records a bookmark indicating a location in the subscriber's voice mailbox so that the subscriber can resume the voice mail session if the subscriber re-enters the voice mailbox using a feature rebound code.

An incoming call that redirects the connection from VMS 204 to IP 206 is preferably initiated by VMS 204. VMS 204 notifies SCP 205 about the impending incoming call through interface 213. Consequently, SCP 205 notifies IP 206 about the impending incoming call through interface 219. SCP 205 instructs serving MSC 202 to redirect the connection from VMS 204 to IP 206 through interface 214. The incoming call between wireless device 201 and IP 206 is consummated, corresponding to a call path comprising radio link 210, serving MSC 202, and interface 215. IP 206 consequently establishes an outgoing call to call sender 208 with a call path comprising facility 217, PSTN/PLMN 207, and facility 218. IP 206 bridges the incoming call and the outgoing call in order to complete the connection between wireless device 201 and call sender 208.

IP 206 monitors the call between wireless device 201 and call sender 208 to determine if a call event occurs. A call event indicates that the subscriber wishes to return to the subscriber's voice mailbox. Examples of call event types include no answer by the call sender, the subscriber generating forced rebound invocation digits (e.g. "*89"), or the end of the call between wireless device 201 and call sender 208. However, one skilled in the art appreciates that other types of call events may be applicable. IP 206 consequently notifies SCP 205 through interface 219.

Upon the occurrence of the call event, SCP 205 instructs serving MSC 202 to re-establish the connection between serving MSC 202 and VMS 204. This is preferably accomplished by utilizing a second routing number by sending a message over interface 214. The connection between wireless device 201 and VMS 204 corresponds to a call path through facility 211, home MSC 203, and interface 212. Because the call connection utilizes the second routing number rather than the first routing number, VMS 204 retrieves the bookmark associated with the subscriber's voice mailbox, and the voice mail session resumes. The subscriber may wish to return a call to a subsequent call sender, and the process described heretofore is repeated.

The architecture shown in FIG. 2 is applicable to variations of embodying the present invention. Serving MSC 202, home MSC 203, VMS 204, SCP 205, and IP 206 should be construed as being logical entities that may physically co-exist with other logical entities as can be appreciated by one skilled in the art. For example, the functionality of SCP 205 may physically reside on the same platform as VMS 204. In such a case, interface 213 will correspond to internal signaling within the common platform. Moreover, serving MSC 202, home MSC 203, VMS 204, SCP 205, and IP 206 typically comprise a computer (processor) in conjunction with peripheral hardware and software.

Figure 3:
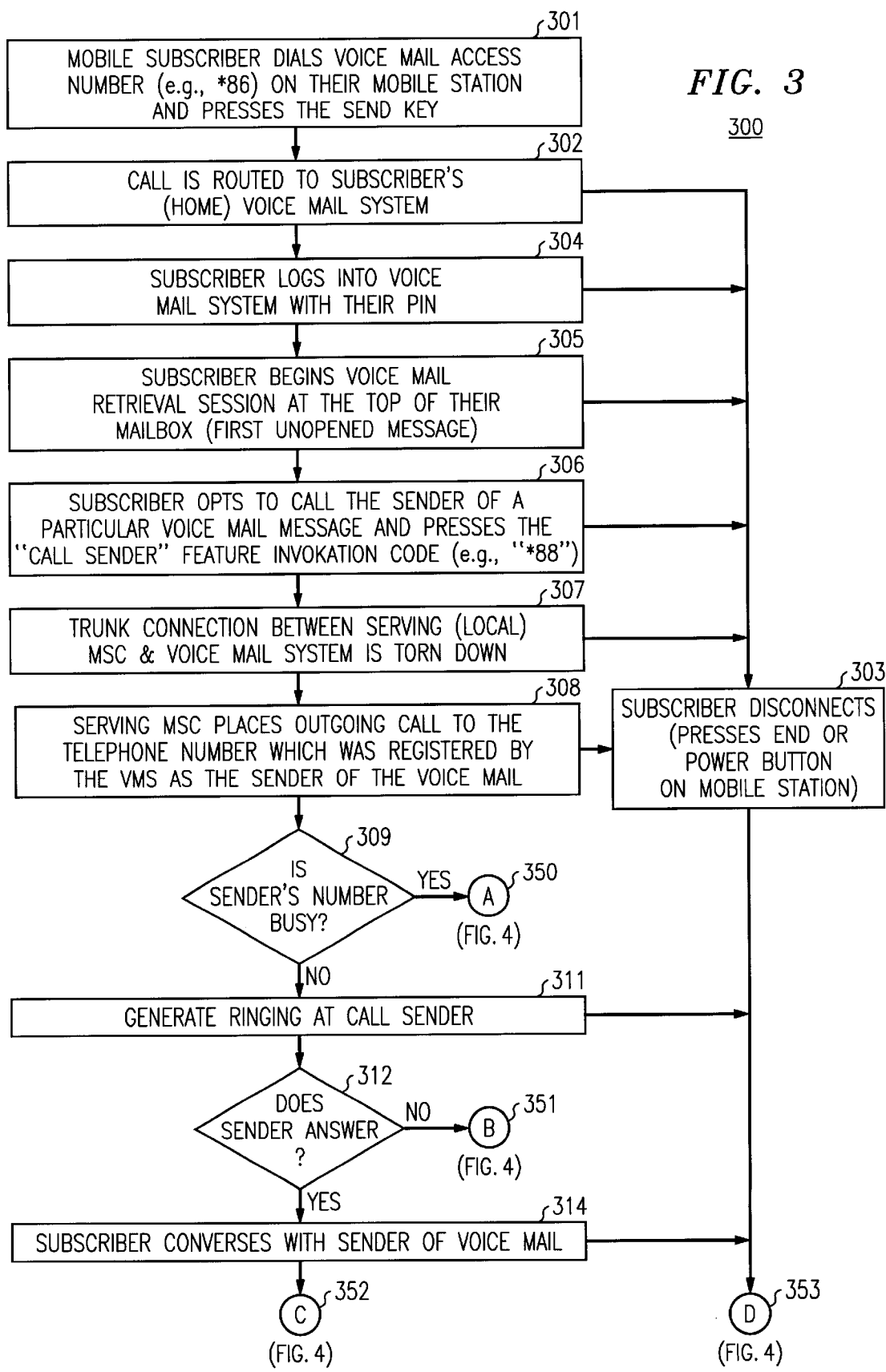
FIG. 3 is a flow diagram depicting a subscriber's interactions in accordance with the present invention.

FIG. 3 is a flow diagram 300 depicting the subscriber's interactions with respect to the present invention. In the context of FIG. 2 and FIG. 5, FIG. 3 facilitates the discussion of the present invention. The subscriber wishes to retrieve voice mail that is contained in the subscriber's voice mailbox resident at VMS 204. In step 301, the subscriber dials a voice mail access number (e.g. "*86") into wireless device 201. A connection is established to VMS 204 in step 302, and the subscriber logs into VMS 204 by entering a personal identity number (PIN) in step 304. If the subscriber disconnects during the voice mail session, such as by pressing end or powering down, step 303 is executed and call flow 300 proceeds to step 353 in FIG. 4.

In step 305, the subscriber begins to retrieve voice messages at the beginning of the subscriber's voice mailbox. Sometime during the session, the subscriber wishes to respond to the call sender associated with one of the voice messages in step 306 by entering the call sender feature invocation code (e.g. "*88"). The call connection between serving MSC 202 and VMS 204 is disconnected in step 307, and a call from wireless device 201 to the call sender is established in step 308. If the call sender's directory number (DN) is busy (i.e. on another call) as detected in step 309, wireless device 201 is disconnected and call processing proceeds to step 350. Otherwise, ringing is generated in step 311. Step 312 determines if the call sender answers the call. If not, wireless device 201 is disconnected, and call flow 300 proceeds to step 351 in FIG. 4. If so, the connection between wireless device 201 and the call sender is completed in step 314 and call flow 300 proceeds to step 352 in FIG. 4.

Figure 4:
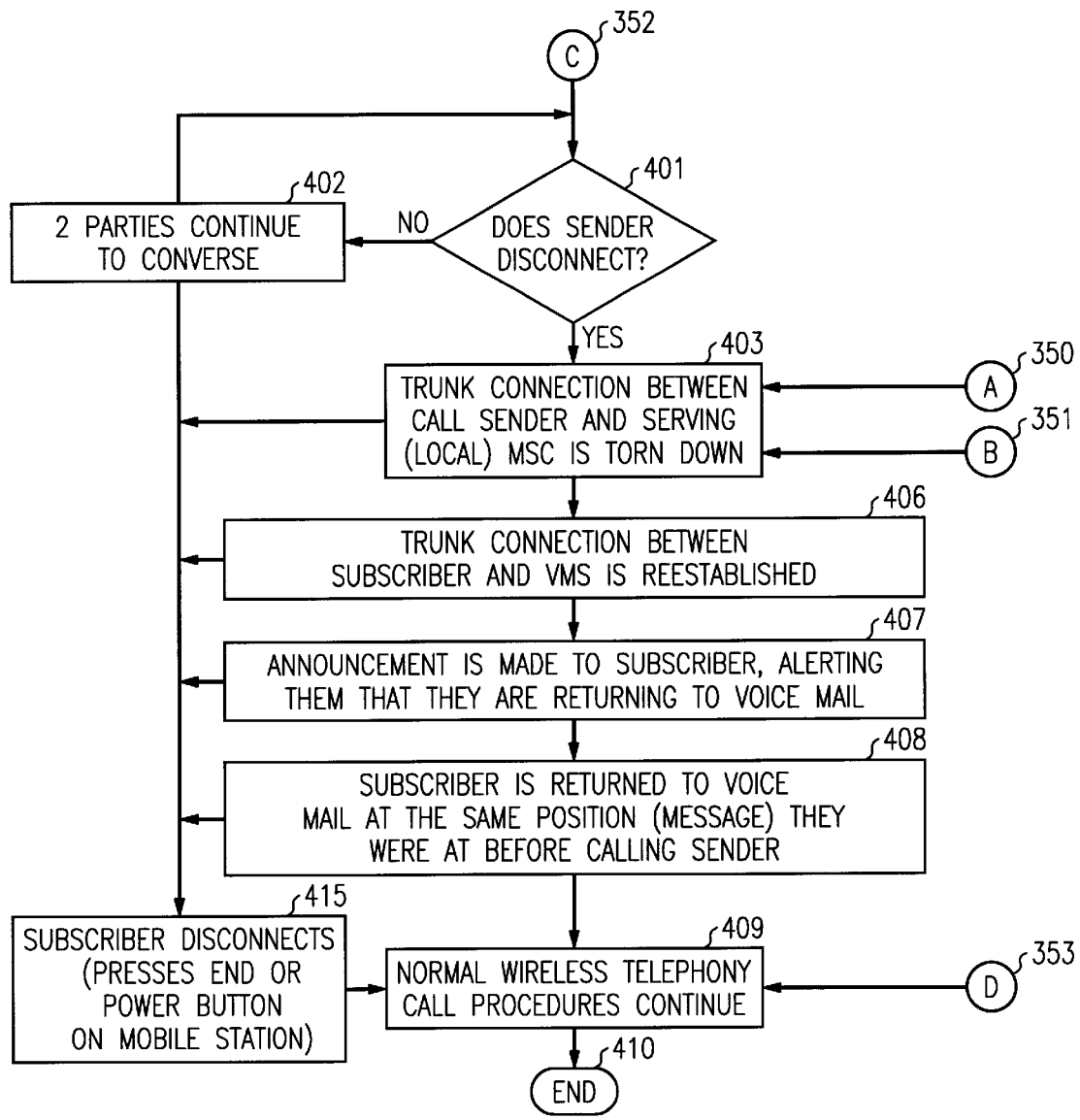
FIG. 4 is a continuation of the flow diagram shown in FIG. 3.
Figure 5:
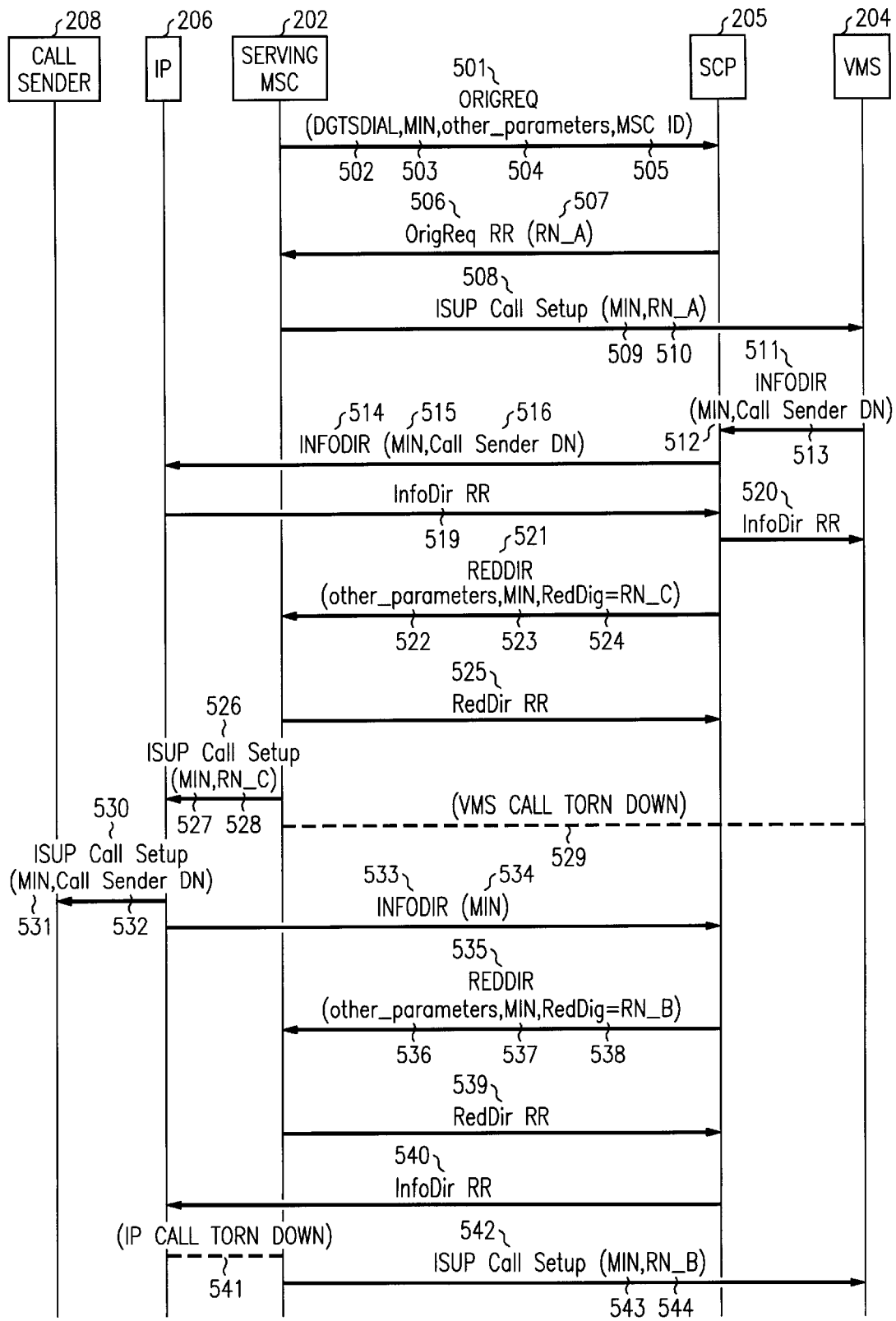
FIG. 5 is a message scenario in accordance with the present invention.

FIG. 4 is a continuation of flow diagram 300 as shown in FIG. 3. If the call flow proceeds with step 352, step 401 subsequently determines if the call sender disconnects. This is preferably executed on IP 206. In a second embodiment, the subscriber enters forced rebound invocation digits into wireless device 201 to indicate to IP 206 that the subscriber wishes to return to VMS 204 in order to resume the voice mail session. If the call sender does not disconnect, the conversation between the subscriber and the call sender proceeds in step 402, and step 352 is repeated.

If step 401 determines that the call sender does disconnect or if step 350 or 351 is reached, step 403 causes the connection between the call sender and serving MSC 202 to be torn down, and step 406 causes the connection between wireless device 201 and VMS 204 to be re-established. If wireless device 201 disconnects during the steps in FIG. 4, step 415 and step 409 are executed.

Depending upon the occurrence of a call event type, IP 206 can invoke an action such as the generation of an announcement that may further query wireless device 201 for instructions for subsequent call processing. As an example, if the call sender does not answer the call after a given number of rings, IP 206 can play an announcement asking the subscriber utilizing wireless device 201 whether the subscriber wishes to rebound back to voice mail (VMS 204) or to deposit a voice message for the call sender. In an exemplary embodiment, IP 206 rebounds the subscriber back to VMS 204 after playing an informational announcement to wireless device 201. As an example, the informational announcement can notify the subscriber that the call sender is not answering and that the subscriber is returning back to voice mail, preferably to the same point at which he left the voice mail system.

An announcement is preferably generated by VMS 204 to wireless device 201 and alerts the subscriber that the voice mail session is being resumed in step 407 by VMS 204. In a second embodiment, the announcement is generated by serving MSC 202. Because the second routing number is utilized in re-establishing the call, VMS 204 causes the session to resume at the next voice message after the previously accessed voice message in step 408. In a second embodiment, the session is resumed at the same message as was previously accessed. The voice mail session continues in step 409 in which the subscriber may wish to return a call to another call sender of a subsequent voice message in step 409. The procedure ends in step 410 at the completion of the voice mail session. Step 410 is also executed subsequent to step 353 in FIG. 3 being executed.

FIG. 5 is a message scenario 500 illustrating the architecture shown in FIG. 2 and the flow diagram shown in FIGS. 3 and 4 according to the present invention. An origination request (ORIGREQ) message 501 is sent from serving MSC 202 to SCP 205 when the subscriber dials the voice mail access code (e.g. "*86" corresponding to step 301 in FIG. 3) on wireless device 201. In the preferred embodiment, ORIGREQ, OrigReq RR, REDDIR, and RedDir RR messages are specified in TIA/EIA-41.1-D: Cellular Radiotelecommunications Intersystem Operations. However, signaling messages can be implemented using other specifications such as TCP/IP or non-standardized intelligent networking (IN) messages.

Message 501 contains a digits dialed (DGTSDIAL) field 502, a mobile identification number (MIN) field 503, other__ parameters 504, and MSC ID field 505. DGTSDIAL field 502 preferably equals the voice mail access code. MIN field 503 preferably is the identification of wireless device 201. In the case that MIN field 503 does not represent the mobile's directory number, TIA/EIA-41.1-D provides a mobile directory number (MDN) field. Other__parameters 504 is used for generating subsequent REDDIR message 521 and includes information such as a billing number and an identification of serving MSC 202. MSC ID 505 field is used by SCP 205 in order to determine the destination of message 514 as subsequently discussed.

In response to ORIGREQ message 501, SCP 205 returns an origination request response (OrigReq RR) message 506 to serving MSC 202. Message 506 includes first routing number (RN__A) 507 that serving MSC 202 utilizes for establishing a connection to VMS 204 with ISUP call setup procedure 508. SCP 205 determines RN__A 507 from data structure 700 (shown in FIG. 7) in which MIN field 503 is associated with the routing numbers that are configured for VMS 204. Procedure 508 corresponds to step 302 in FIG. 3 and contains MIN field 509 and RN__A field 510. In an exemplary embodiment, ISUP call setup procedure 508 is in accordance with System Signaling 7 (SS7) standards. At this point of time, a connection is established between wireless device 201 and VMS 204 through serving MSC 202.

If the subscriber wants to return a call to the call sender of a voice mail message (corresponding to saved digits of the call sender's DN), the subscriber enters a call sender invocation code (e.g. *88) into wireless device 201, which causes VMS 204 to send an information directive (INFODIR) message 511 with MIN field 512 corresponding to the identification of wireless device 201 and call sender DN field 513 corresponding to the call sender's DN in accordance with step 306 in FIG. 3. SCP 205 acknowledges message 511 by returning an information directive response (InfoDir RR) message 520 to VMS 204. Subsequent to receiving INFODIR message 511, SCP 205 sends an information directive (INFODIR) message 514 to IP 206 informs IP 206 about an impending incoming call from wireless device 201.

Wireless communications system 200 may comprise a plurality of intelligent peripherals in which an intelligent peripheral is associated with at least one mobile switching center. Each intelligent peripheral and voice messaging application supported by the intelligent peripheral is preferably identified by a point code (PC) and subsystem number (SSN). The PC is an address of the intelligent peripheral and the SSN is an address of a SS7 application, such as a voice messaging service. Moreover, global title routing simplifies addressing and does not require each service control point to explicitly know the PC and SSN of each intelligent peripheral. Rather, a globally known address is translated by a service transfer point (STP).

Figure 6:
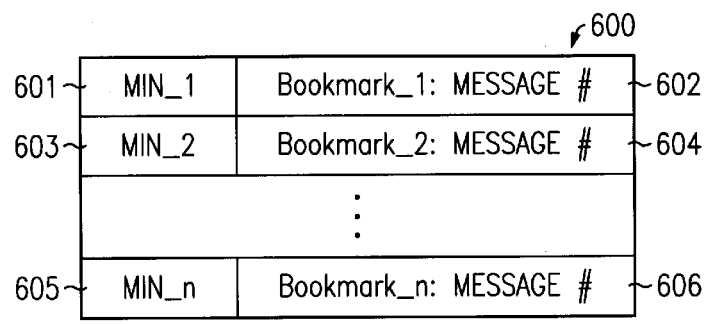
FIG. 6 depicts a data structure utilized at a voice messaging system in accordance with the present invention.
Figure 8:
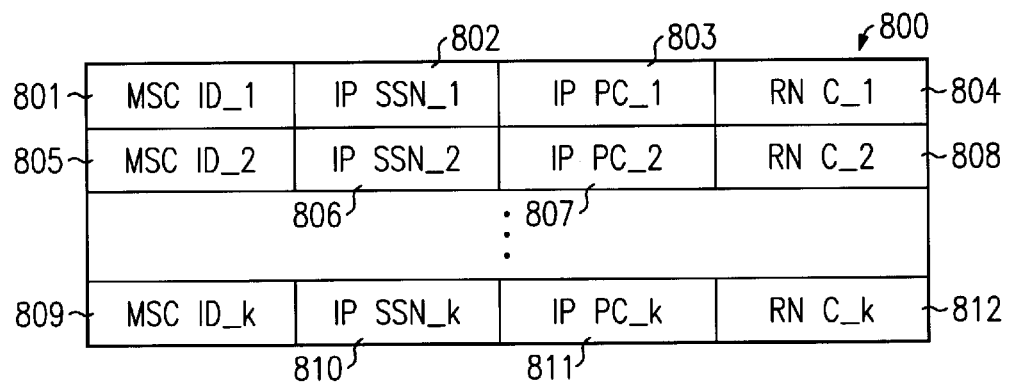
FIG. 8 depict a data structure utilized at a signaling control point for determining a relationship with an intelligent peripheral in accordance with the present invention.

SCP 205 determines the appropriate intelligent peripheral by utilizing the MSC ID that is contained in field 505 of message 501. SCP 205 utilizes data structure 800 shown in FIG. 8 (as is subsequently discussed) to determine the point code (PC) and subsystem number (SSN) of IP 206. Also, SCP 205 retrieves an associated third routing number (RN C 804, 808, or 812 as shown in FIG. 8) that is used in subsequent message 521. IP 206 acknowledges message 514 by returning an information directive response (InfoDir RR) message 519 to SCP 205. Upon receiving InfoDir RR message 519, SCP 205 returns an information directive response (InfoDir RR) message 520 to VMS 204 in order to acknowledge message 511. VMS 204 then saves a bookmark that indicates the voice message that the subscriber is accessing. The bookmark is stored in data structure 600 as shown in FIG. 6.

SCP 205 sends a redirection directive (REDDIR) message 521 with other_parameters field 522 (obtained from field 504 in message 501), MIN field 523, and registered digits (RedDig) field 524 (equal to third routing number RN_C that is obtained from data structure 800). RedDig field 524 is subsequently utilized in ISUP call setup procedure 526. Serving MSC 202 acknowledges REDDIR message 521 by returning a redirection directive response (RedDir RR) message 525 to SCP 205. Serving MSC 202 redirects the connection between wireless device 201 to IP 206 by executing ISUP call setup procedure 526 with MIN field 527 (identifying wireless device 201) and third routing number RN_C 528. Because procedure 526 utilizes third routing number RN_C 528, IP 206 interprets the messaging associated with procedure 526 as an incoming call for returning a call to a call sender. The connection between VMS 204 and serving MSC 202 is torn down 529 (corresponding to step 307 in FIG. 3).

Figure 9:
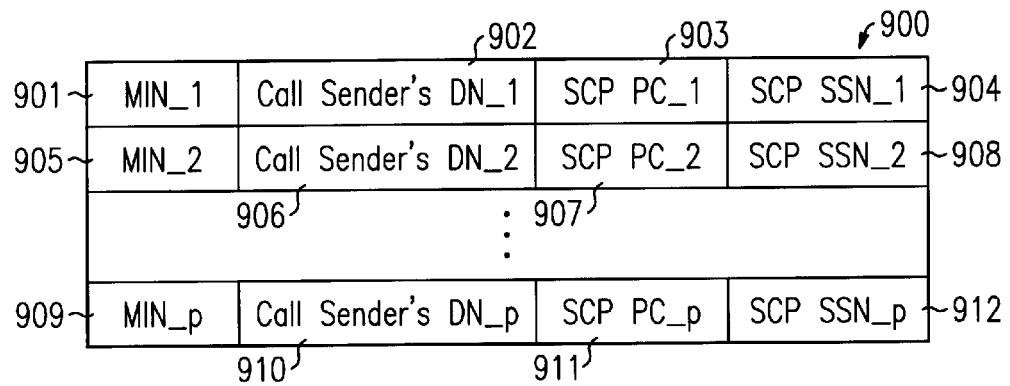
FIG. 9 depicts a dynamic data structure utilized at an intelligent peripheral in accordance with the present invention.

IP 206 consequently initiates an outgoing call to call sender 208's DN by executing ISUP call setup procedure 530 that contains MIN field 531 and call sender DN field 532. IP 206 determines call sender's DN 532 from data structure 900 as shown in FIG. 9. IP 206 stores the call sender's DN that is associated with MIN as contained in INFODIR message 514 in data structure 900. With the completion of the outgoing call between IP 206 and call sender's DN 208, IP 206 bridges the incoming call and the outgoing call to complete the connection between wireless device 201 and call sender's DN 208.

With the connection redirected between wireless device 201 and call sender's DN 208, IP 206 monitors the connection to determine if a call event occurs. The call event is indicative of the subscriber rebounding to VMS 204. The call events include the call sender disconnecting, the subscriber entering a rebound code, and the call sender's DN busy. When a call event occurs (corresponding to step 401 in FIG. 4), IP 206 sends an information directive (INFODIR) message 533 with MIN field 534 to SCP 205. Message 533 does not contain a calling party number string as is contained in message 514 with field 516. SCP 205 interprets that message 533 indicates that wireless device 201 is being rebounded back to voice mail at VMS 204 because the calling party number string is not included in message 533.

Figure 7:
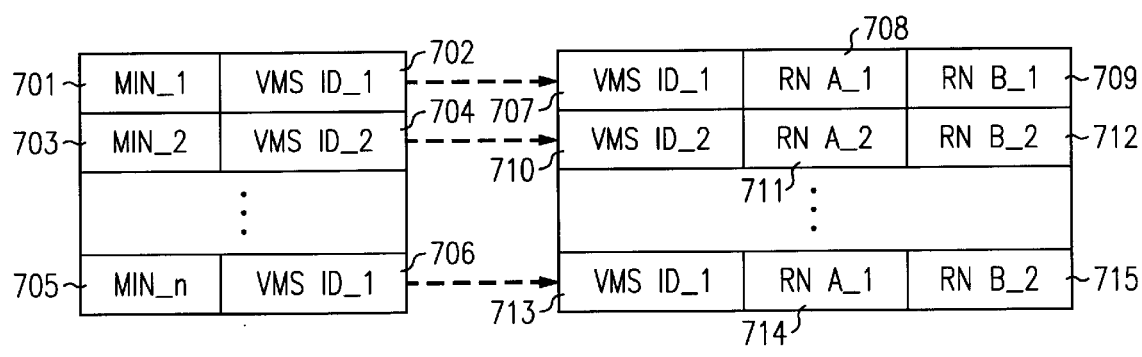
FIG. 7 depicts a data structure utilized at a signaling control point in accordance with the present invention.

SCP 205 uses a mobile identification number (MIN) field 534 to determine second routing number RN_B 538 from data structure 700 (shown in FIG. 7). Consequently, SCP 205 sends a redirection directive (REDDIR) message 535 to serving MSC 202 in order to re-establish the connection between wireless device 201 and VMS 204. Message 535 contains other_parameters 536 (obtained from other_parameters 504), MIN field 537, and RedDig field 538 (equal to second routing number RN_B). Serving MSC 202 acknowledges message 535 by returning a redirection directive response (RedDir RR) message 539 to SCP 205. SCP 205 returns an information directive response (InfoDir RR) message 540 to IP 206 in order to acknowledge INFODIR message 533. The incoming call to IP 206 is torn down upon receipt of message 541, which corresponds to step 403 in FIG. 4 and serving MSC 202 reroutes the connection from wireless device 201 to VMS 204 by sending ISUP call setup procedure 542 to VMS 204 (corresponding to step 406 in FIG. 4). Message 542 includes MIN field 543 and RN_B field 544. Because procedure 542 utilizes the second routing number rather than the first routing number, VMS 204 resumes the voice mail session with the bookmark that is stored in data structure 600.

FIG. 6 depicts data structure 600 that is preferably utilized at VMS 204 in order to save a bookmark for the subscriber's voice mail session. Data structure 600 stores the bookmarks for n voice mail sessions, each session corresponding to a wireless device that are identified in fields 601, 603, and 605. The corresponding bookmarks correspond to fields 602, 604, and 606. VMS 204 stores the bookmark of the subscriber when InfoDir RR message 520 is received from SCP 205. The bookmark is retrieved by VMS 204 when the voice mail session is re-established after VMS 204 receives ISUP call setup procedure 540. In a second embodiment of the present invention, automatic speech recognition or DTMF prompting is utilized to obtain the identification of wireless device 201.

FIG. 7 depicts data structure 700 utilized at SCP 205 in order to determine the first routing number and the second routing number that are assigned to the voice messaging system, e.g. VMS 204. Data structure 700 associates an identification of the VMS (corresponding to fields 702, 704, and 706) with the identification of the wireless device (corresponding to fields 701, 703, and 705). As an example, with a wireless device having an identification equal to MIN_2 703, SCP 205 determines that the VMS identification is equal to VMS ID_2 704. The corresponding first routing number equals RN A_2 711 and the second routing number equals RN B_2 712.

FIG. 8 depicts data structure 800 utilized at SCP 205 in order to determine the addressing for the appropriate intelligent processor. The addressing comprises the point code (PC) and the subsystem number (SSN). SCP 205 is cognizant of the wireless device's identity from MIN field 503 and the serving MSC's identity from MSC ID field 505 in message 501. In the exemplary embodiment, the MSC ID that is associated with wireless device 201 is chosen from MSC ID entry 801, 805, or 809. SCP 205 determines the PC of IP 206 (IP PC 803, 807, or 811), SSN of IP 206 (IP SSN 802, 806, or 812), and third routing number RN_C (RN_C 804, 808, or 812) from MSC ID field 505.

FIG. 9 depicts dynamic data structure 900 utilized by IP 206 in order to determine call sender's DN 508 and the address of SCP 205 that is associated with wireless device 201. IP 206 saves the call sender's DN (902, 906, or 910), SCP PC (903, 907, or 911), and SCP SSN (904, 908, or 912) that are associated with the MIN of wireless device 201 (901, 905, or 909). IP 206 stores the call sender's DN that is contained in INFODIR message 514. Also, IP 206 stores the address of SCP 205 (PC and SSN) as indicated by fields in message 514.

While this invention has been described in terms of certain examples thereof, it is not intended that it be limited to the above description, but rather only to the extent set forth in the claims that follow.

We claim:

1. A wireless communication system providing a voice messaging service for a subscriber, the subscriber associated with a voice mailbox for the voice messaging service, the subscriber utilizing a wireless device, the wireless communications system comprising:

a voice messaging system (VMS);

a serving mobile switching center (MSC) connected to the VMS;

means for requesting a first routing number from a service control point (SCP) by the serving MSC in response to the subscriber invoking the voice messaging service;

means for establishing a connection between the wireless device and the VMS through the serving MSC utilizing the first routing number, the connection enabling the subscriber to retrieve a voice message deposited by a call sender;

means for saving a bookmark by the VMS in response to the subscriber's interaction with the voice messaging service, the bookmark indicating a location in the voice mailbox;

means for redirecting the connection from the VMS to the call sender's directory number (DN) through the serving MSC and an intelligent peripheral (IP) by the VMS in response to the subscriber invoking a call sender option;

means for notifying the SCP about a rebound indicator, the rebound indicator corresponding to a call event type selected from the group consisting of a release by a call sender, forced rebound invocation digits entered by the subscriber, no answer by the call sender, the call sender busy, the call sender unavailable, and the call sender invalid;

means for instructing the serving MSC to re-establish the connection between the subscriber and the VMS utilizing a second routing number in response to the means for notifying the SCP by the IP;

means for re-establishing the connection to the VMS in response to the means for instructing the serving MSC by the SCP; and means for resuming the voice messaging service for the subscriber utilizing the bookmark.

2. A method for providing a voice messaging service for a subscriber in a wireless communications system, the subscriber associated with a voice mailbox for the voice messaging service, the voice mailbox associated with a voice messaging system (VMS), the subscriber utilizing a wireless device, the wireless device being served by a serving mobile switching center (MSC), the method comprising the steps of:

requesting a first routing number from a service control point (SCP) by the serving MSC responsive to the subscriber invoking the voice messaging service;

establishing a connection between the wireless device and the VMS through the serving MSC utilizing the first routing number, the connection enabling the subscriber to retrieve a voice message deposited by a call sender;

saving a bookmark by the VMS, the bookmark indicating a location in the voice mailbox responsive to the subscriber's interaction with the voice messaging service;

redirecting the connection from the VMS to a call sender's directory number (DN) through the serving MSC and an intelligent peripheral (IP) by the VMS responsive to the subscriber invoking a call sender option;

notifying the SCP by the IP about a rebound indicator;

instructing the serving MSC by the SCP to re-establish the connection between the subscriber and the VMS utilizing a second routing number responsive to the step of notifying the SCP by the IP; and upon failing to re-establish the connection between the subscriber and the VMS, alerting the subscriber to the failure to re-establish the connection, wherein the failure to re-establish the connection is caused by the call sender not answering the call request.

3. A method for providing a voice messaging service for a subscriber in a wireless communications system, the subscriber associated with a voice mailbox, for the voice messaging service, the voice mailbox associated with a voice messaging system (VMS), the subscriber utilizing a wireless device, the wireless device being served by a serving mobile switching center (MSC), the method comprising the steps of:

requesting a first routing number from a service control point (SCP) by the serving MSC responsive to the subscriber invoking the voice messaging service;

establishing a connection between the wireless device and the VMS through the serving MSC utilizing the first routing number, the connection enabling the subscriber to retrieve a voice message deposited by a call sender;

saving a bookmark by the VMS, the bookmark indicating a location in the voice mailbox responsive to the subscriber's interaction with the voice messaging service;

redirecting the connection from the VMS to a call sender's directory number (DN) through the serving MSC and an intelligent peripheral (IP) by the VMS responsive to the subscriber invoking a call sender option;

notifying the SCP by the IP about a rebound indicator;

instructing the serving MSC by the SCP to re-establish the connection between the subscriber and the VMS utilizing a second routing number responsive to the step of notifying the SCP by the IP; and upon failing to re-establish the connection between the subscriber and the VMS, alerting the subscriber to the failure to re-establish the connection, wherein the step of alerting the subscriber comprises playing an announcement to the subscriber.

4. A method for providing a voice messaging service for a subscriber in a wireless communications system, the subscriber associated with a voice mailbox for the voice messaging service, the voice mailbox associated with a voice messaging system (VMS), the subscriber utilizing a wireless device, the wireless device being served by a serving mobile switching center (MSC), the method comprising the steps of:

requesting a first routing number from a service control point (SCP) by the serving MSC responsive to the subscriber invoking the voice messaging service;

establishing a connection between the wireless device and the VMS through the serving MSC utilizing the first routing number, the connection enabling the subscriber to retrieve a voice message deposited by a call sender;

saving a bookmark by the VMS, the bookmark indicating a location in the voice mailbox responsive to the subscriber's interaction with the voice messaging service;

redirecting the connection from the VMS to a call sender's directory number (DN) through the serving MSC and an intelligent peripheral (IP) by the VMS responsive to the subscriber invoking a call sender option;

notifying the SCP by the IP about a rebound indicator;

instructing the serving MSC by the SCP to re-establish the connection between the subscriber and the VMS utilizing a second routing number responsive to the step of notifying the SCP by the IP;

upon failing to re-establish the connection between the subscriber and the VMS, alerting the subscriber to the failure to re-establish the connection; and asking the subscriber utilizing the wireless device whether the subscriber wishes to rebound back to voice mail.

* * * * *